UNITED STATES PATENT OFFICE 2,473,800

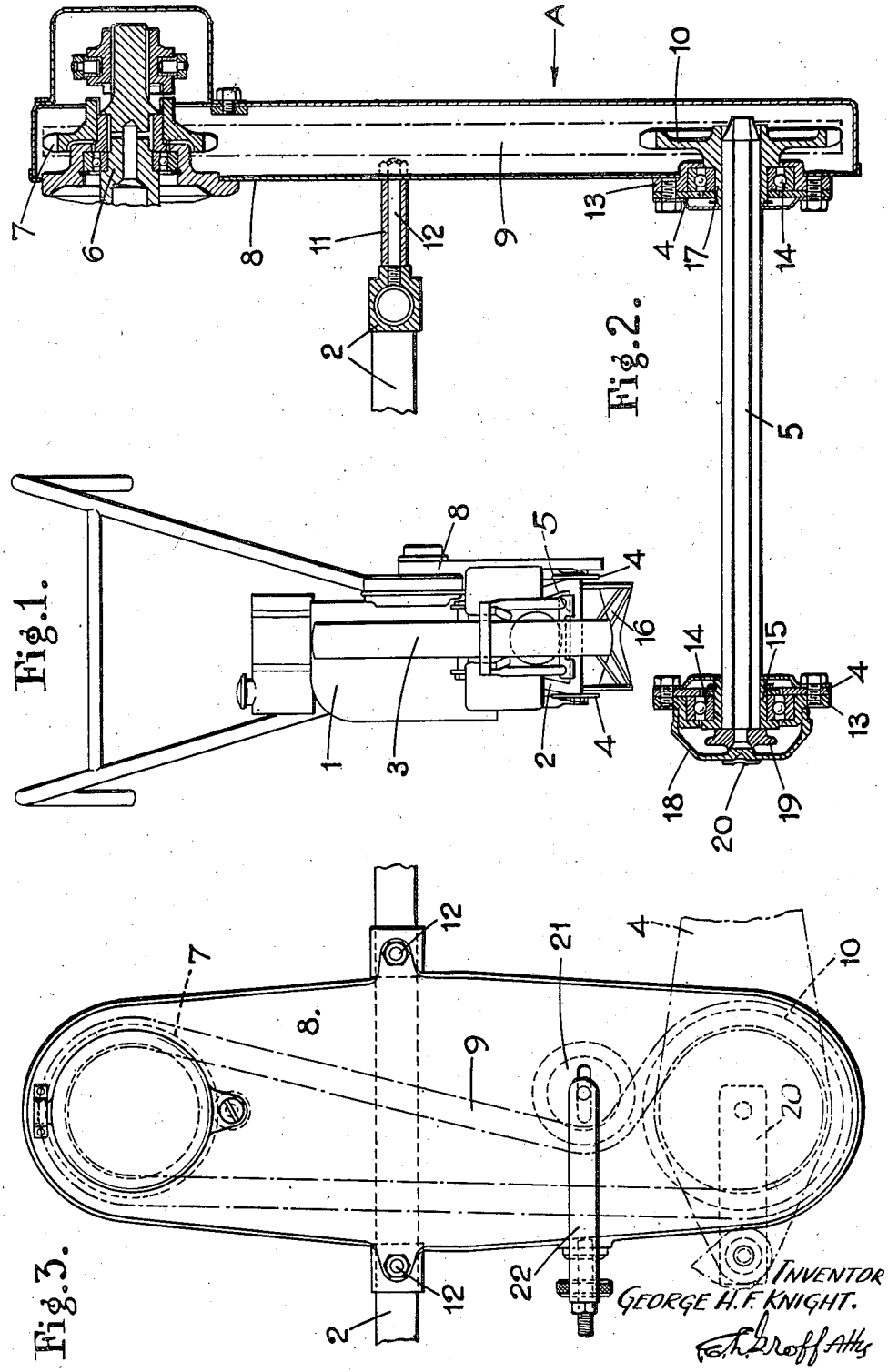

MOUNTING AND DRIVING THE LAND ROTOR OF AGRICULTURAL OR LIKE VEHICLES

George Hugh Foley Knight, Basingstoke, England

Application October 21, 1947, Serial No. 781,224
In Great Britain July 28, 1944

Section 1, Public Law 690, August 8, 1946
Patent expires July 28, 1964

6 Claims. (Cl. 180—19)

This invention concerns improvements in and relating to agriculture, horticultural and like implements of the kind wherein a power unit, e. g. an internal combustion engine, mounted on the chassis of the implement, drives a rotary element engaging the ground for the purposes of propulsion. In the present invention a rotor having strakes, spuds, or land-engaging surfaces is employed in the preferable embodiment, but it is to be understood that any suitable rotary member running over the land for securing propulsion is included in the term "rotor" as the invention is concerned solely with the method of detachably mounting the rotor on the vehicle in driven engagement with the power unit.

The present invention is particularly applicable to power-driven agricultural, horticultural and like implements, a description intended to include not only self-propelled implements or vehicles adapted to transport and/or operate horticultural and similar devices (such as tree and crop sprayers, dusters, pumps, turf cutters, mowers, hedge clippers, rollers, and so forth), all of which are adapted to run on farm and garden land, and over soft ground generally; the invention also relates to tractor employed for operating over such land and unmetalled surfaces. Whilst the invention is applicable generally to vehicles of the foregoing description it is especially designed for a comparatively light-duty vehicle suitable for use by farmers, market gardeners and private or smallholding farmers or gardeners for operating light ploughs, cultivators, diggers, barrows, hoes, planters, seeders, tedders and the like, as well as the horticultural devices hereinbefore mentioned.

The object of the present invention is to provide an extremely simple means whereby one form of propulsive rotor may be replaced by another.

According to the present invention there is provided mounting and driving means for interchangeable rotors of an agricultural, horticultural or like implement which comprises in combination bearing housings attached one each to two carrier frames of the chassis of the implement, a radial ball or roller bearing mounted in each of said housings, a first bearing sleeve fixedly supported in the inner race of one bearing, a chain sprocket wheel connected with a power unit on the implement chassis and having a sleeve-like hub fixedly supported in the inner race of the other bearing and constituting a second bearing sleeve, and a rotor supporting and driving axle non-rotatably mounted in the said bearing sleeves so as to be driven by the second bearing sleeve, the first bearing sleeve and its bearing housing being fitted with detachable means normally preventing endwise movement of the axle, but facilitating said movement when detached to enable the axle to be withdrawn for replacing the rotor by another.

A practical embodiment of the invention is illustrated by the accompanying drawings, wherein—

Figure 1 is a front view of an agricultural implement to which the rotor mounting and drive unit is applied;

Figure 2 is a transverse section through the unit drawn to a larger scale; and

Figure 3 is a side view in the direction of arrow A, Figure 2.

In the embodiment illustrated an internal combustion engine 1 (Fig. 1) is carried on an upper part of the vehicle framework or chassis 2, supported by a front land wheel 3, and the lower part of the chassis 2 includes a pair of vertically disposed plates 4 constituting sides of the lower framework, i. e. running from front to rear. These plates 4 are carrier plates for the rotor axle. They are advantageously of elongated diamond-shape, the respective bottom middle corners of the diamonds being located just above ground level.

The drive from the engine 1 to the rotor axle 5 is via a gear box (not shown) to a power shaft 6 projecting from one side of the vehicle chassis 1. The power shaft 6 carries a chain sprocket wheel 7 enclosed in the upper end of a chain case 8 extending downwardly to the carrier plate 4 on that side. Inside the chain case 8 is a chain 9 leading to a terminal sprocket 10 housed inside the bottom of the chain case 8, said case 8 being supported by spacers 11 and bolts 12 from the upper part of the chassis 2.

On each side carrier plate 4 is mounted a housing 13 enclosing a radial ball bearing 14, the inner race of one bearing being bushed by a bearing sleeve 15 fixed therein and adapted to receive the live axle 5 for the rotor 16. The hub 17 of the sprocket wheel 10 is made of sleeve form and is fixedly carried by the inner race of the bearing on that side in alignment with bearing sleeve 15. The outer races of both bearings 14 are fixedly held in the housings 13. The bores of the sleeve 15 and the sprocket hub 17 are complemental in shape to the section of the axle 5, which latter is splined, feathered, hexagonal (as shown), square or other suitable configuration for the purpose of being non-rotatable in, but rotating with, the sleeve 15 and sprocket hub 17.

The rotor 16 is axially bored (also to match the shape of the axle), and is mounted in position by placing it between the carrier plates 4 and then slipping the axle 5 endwise through the bearing sleeve 15, through the rotor 16 (not shown in Figure 2), and then into hub 17 of the sprocket wheel 10. The axle 5 is secured against endwise movement in any suitable way; for example, a cap 18 may be placed over the bearing housing 13 of the sleeve 15 and held in contact with an extracting flange 19 on the axle end by means of a leaf spring 20.

A chain jockey wheel 21 is connected to an adjustable yoke 22 carried on the chain case 8.

If desired, only the portion of the rotor axle 5 which enters the sleeve-like hub 17 of the sprocket wheel 10 need be of non-circular form in cross section to transmit driving torque from the sprocket wheel to the axle. Alternatively, the axle 5 need only be of non-circular form in cross section over sufficient portion of its length to afford engagement with both bearing sleeves 15 and 17 and the intermediate rotor 16.

I claim:

1. Mounting and driving means for interchangeable rotors of an agricultural, horticultural or like implement having a chassis comprising in combination, bearing housings attached one to each of two carrier frames disposed at the sides of the chassis of the implement, a radial ball or roller bearing mounted in each of said housings, a first bearing sleeve fixedly supported in the inner race of one bearing, a chain sprocket wheel connected with a power unit on the implement chassis and having a sleeve-like hub fixedly supported in the inner race of the other bearing and constituting a second bearing sleeve aligned with the first, and a rotor supporting and driving axle non-rotatably mounted in the said bearing sleeves so as to be driven by the second bearing sleeve, the bearing housing of said first bearing sleeve being fitted with detachable means normally preventing endwise movement of the axle, but facilitating said movement when detached to enable the axle to be withdrawn for replacing the rotor by another.

2. Mounting and driving means according to claim 1, wherein the outer races of said bearings are fixedly held respectively by the carrier frames of the chassis.

3. Mounting and driving means according to claim 1, in which at least that portion of the rotor axle which enters the sleeve-like hub of the sprocket wheel is of non-circular form in cross section to transmit driving torque from the said sprocket wheel to the axle.

4. Mounting and driving means according to claim 1, in which the rotor axle is of non-circular form in cross section over sufficient portion of its length to afford engagement with both bearing sleeves and the intermediate rotor.

5. Rotor mounting and driving means as claimed in claim 1, characterised in that the rotor axle is uniformly of square, hexagonal or similar regular form over its entire length to permit of longitudinal insertion into the complementarily shaped aligned sleeves and rotor.

6. A power-driven agricultural or other wheeled implement as defined by claim 1 wherein the chassis has a pair of depending parallel side carrier plates, a ground wheel non-rotatably mounted on the rotor supporting and driving axle supporting the chassis, and means for transmitting driving torque from the power unit to said chain sprocket wheel drivingly connected to the axle driving means.

GEORGE HUGH FOLEY KNIGHT.

REFERENCES CITED

The following references are of record in the file of this patent:

UNITED STATES PATENTS

| Number | Name | Date |
|---|---|---|
| 1,084,908 | Starriett | Jan. 20, 1914 |
| 1,616,341 | Walling | Feb. 1, 1927 |